US012378804B2

(12) United States Patent
Dolega

(10) Patent No.: US 12,378,804 B2
(45) Date of Patent: Aug. 5, 2025

(54) DOOR HINGE COVER

(71) Applicant: Przemyslaw Dolega, Mississauga (CA)

(72) Inventor: Przemyslaw Dolega, Mississauga (CA)

(73) Assignee: Przemyslaw Dolega, Mississauga (CA)

( * ) Notice: Subject to any disclaimer, the term of this patent is extended or adjusted under 35 U.S.C. 154(b) by 0 days.

(21) Appl. No.: 18/128,562

(22) Filed: Mar. 30, 2023

(65) Prior Publication Data

US 2024/0328222 A1 Oct. 3, 2024

(51) Int. Cl.
*E05D 11/00* (2006.01)

(52) U.S. Cl.
CPC ................................ *E05D 11/0054* (2013.01)

(58) Field of Classification Search
CPC ......... E05D 11/0054; E05D 2011/0063; E05D 2011/0072
See application file for complete search history.

(56) References Cited

U.S. PATENT DOCUMENTS

| | | | | |
|---|---|---|---|---|
| 3,032,181 A * | 5/1962 | Hutter | C09J 7/21 | 428/40.1 |
| 3,961,602 A * | 6/1976 | Dresser | B05B 12/24 | 428/41.7 |
| 4,691,409 A * | 9/1987 | Torgerson | E05D 11/0054 | 16/404 |
| 4,796,330 A * | 1/1989 | Ziegler | E05D 11/0054 | 16/DIG. 40 |
| 4,921,028 A * | 5/1990 | Schwartz | B05B 12/24 | 16/DIG. 30 |
| 5,056,191 A * | 10/1991 | Love | B05B 12/24 | 16/250 |
| 5,198,031 A * | 3/1993 | Derstine | B05B 12/20 | 118/301 |
| 5,224,240 A * | 7/1993 | Smith | E05D 11/0054 | 16/250 |
| 5,722,120 A * | 3/1998 | Bindschatel | B05B 12/24 | 16/250 |
| 6,165,269 A * | 12/2000 | Kathe | B05B 12/20 | 118/504 |
| 6,555,169 B2 * | 4/2003 | Lynch | B05D 1/32 | 427/272 |
| 6,745,435 B2 * | 6/2004 | Bowers | B05B 12/24 | 16/250 |

(Continued)

*Primary Examiner* — Jason W San
*Assistant Examiner* — Matthew J Sullivan
(74) *Attorney, Agent, or Firm* — Argus Intellectual Enterprise, LLC; Daniel Enea; Jordan Sworen

(57) ABSTRACT

A hinge cover for temporarily protecting a door hinge. The hinge cover includes a first cover with an elastic hinge that fits over one side of the door hinge leaves, pin, and knuckle. A first and second panel are disposed on opposing sides of the elastic hinge and can be positioned over hinge leaves extending from the pin and knuckle of the door hinge. Additionally, the hinge cover includes a second cover having two tape strips with adhesive zones and non-adhesive central zones. The first and second tape strips are used to secure the second cover to the other side of the pin and knuckle, with the non-adhesive central zones covering the pin. The hinge cover provides protection to the hinge from paint while painting nearby surfaces, as well as from dirt, dust, and other contaminants, reducing the need for frequent cleaning and maintenance, while improving the aesthetics of the hinge.

7 Claims, 6 Drawing Sheets

(56) References Cited

U.S. PATENT DOCUMENTS

| | | | | |
|---|---|---|---|---|
| 6,854,162 | B2 * | 2/2005 | Emerson | E05D 11/0054 16/DIG. 40 |
| 6,883,205 | B2 * | 4/2005 | Martinez-Munoz | E05D 11/0054 16/250 |
| 9,181,749 | B1 * | 11/2015 | Davis | E05D 11/0054 |
| D861,456 | S * | 10/2019 | Sandoval | D8/323 |
| 11,964,292 | B2 * | 4/2024 | Rivera | E05D 11/0054 |
| 2001/0036540 | A1 * | 11/2001 | Pringle | C09J 7/20 428/202 |
| 2007/0084013 | A1 * | 4/2007 | Henrich | E05D 11/0054 16/258 |
| 2007/0136989 | A1 * | 6/2007 | Lee | E05D 11/0054 16/254 |
| 2007/0172618 | A1 * | 7/2007 | Schivley | E05D 11/0054 428/40.1 |
| 2008/0244867 | A1 * | 10/2008 | Tuell | E05D 11/0054 16/250 |
| 2016/0076287 | A1 * | 3/2016 | Sandoval | E05D 11/0054 16/250 |

* cited by examiner

DOOR HINGE COVER

BACKGROUND OF THE INVENTION

The present invention relates to a door hinge cover. More specifically, the present invention relates to a hinge cover for a door that is used to temporarily cover a hinge when painting the door or surrounding walls.

Painting interior spaces, whether in residential or commercial settings, is a common practice that helps to maintain the aesthetic appeal of a property. However, one of the main challenges of painting is the potential for paint to come into contact with surfaces that are not intended to be painted. This is especially true when spray painting door frames and hinges, where it can be difficult to avoid getting paint on the hinges, which can compromise their functionality, durability, and aesthetic look.

To address these challenges, the present invention provides a hinge cover that can be temporarily attached to the door hinge, protecting it from paint while nearby surfaces are being painted. There exists some devices and techniques for covering these door hinges. For example, one technique utilizes painter's tape to cover the hinge. However, painter's tape often fails to stick to the surface of the hinge, leaving the hinge exposed to paint and other contaminants. Additionally, when the door is repeatedly opened and closed, the tape loses its adhesion or tears, thereby exposing the door hinge. Further, the tape must be shaped to address the specific size of the door hinge. Some devices exist and include a general shape of a hinge that are capable of covering a door hinge. However, these devices fail to include an elastic central area that is capable of fitting on different sized hinges or expanding and retracting when a door is opened and closed, which leads to degradation of the hinge cover. Therefore, there is a need in the known art to provide a hinge cover capable of temporarily covering and stretching over hinges of varying sizes.

In light of the devices disclosed in the known art, it is submitted that the present invention substantially diverges in design elements and methods from the known art and consequently it is clear that there is a need in the art for an improvement for a door hinge cover. In this regard the instant invention substantially fulfills these needs.

SUMMARY OF THE INVENTION

In view of the foregoing disadvantages inherent in the known types of door hinge covers now present in the known art, the present invention provides a new door hinge cover for protecting a door hinge from paint while painting nearby surfaces.

It is an objective of the present invention to provide a door hinge cover for doors comprising that solves the problem of protecting door hinges from paint during painting of surrounding surfaces. The invention provides a hinge cover that can be used to temporarily protect the door hinge from paint while the door and nearby surfaces are being painted. The hinge cover includes a front cover and a rear cover, which, when assembled, completely covers the entire hinge on both sides.

It is an objective of the present invention to provide a door hinge cover that comprises an elastic section, allowing it to expand and retract as the door hinge transitions between an open and closed position. This ensures that the hinge cover does not interfere with the normal functioning of the door hinge, allowing it to open and close smoothly.

It is also an objective of the present invention to provide a door hinge cover that completely covers each element of the door hinge, including the hinge leaves, the hinge pin, and the knuckle. The hinge cover includes a first cover with an elastic hinge that fits over one side of the door hinge pin, and first and second panels disposed on opposing sides of the elastic, adapted to be positioned over the hinge leaves. The hinge cover also includes a second cover comprising two tape strips with adhesive zones and non-adhesive central zones. The first and second tape strips are used to secure the cover to the other side of the pin, with the non-adhesive central zones covering the pin. This design allows for easy installation and removal of the hinge cover.

It is yet another objective of the present invention to provide a door hinge cover that is easy to apply and remove without leaving residue or marks on the door hinge. The hinge cover's adhesive zones are designed to securely adhere to the door hinge during painting and can be easily removed after use without leaving any sticky residue.

It is another objective of the present invention to provide a door hinge cover that is disposable. The hinge cover is designed to be used once and then discarded, reducing the need for frequent cleaning and maintenance of the hinge. The use of disposable covers also saves time and eliminates the need for washing and reusing the same cover.

It is therefore an object of the present invention to provide a new and improved door hinge cover for doors that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
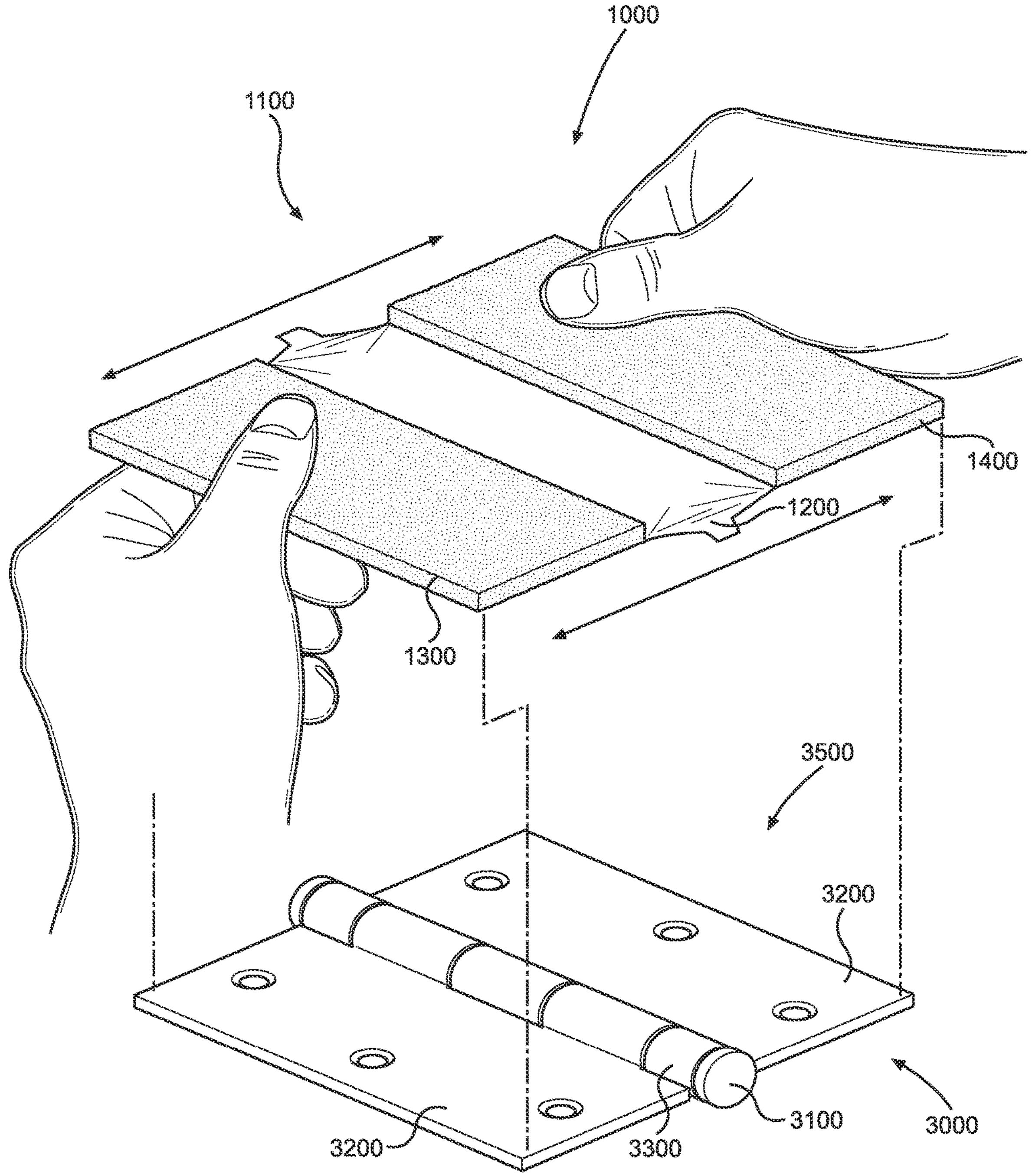
FIG. 1 shows a perspective view of an embodiment of the first cover of the door hinge cover positioned above a first side of a door hinge.

Reference is made herein to the attached drawings. Like reference numerals are used throughout the drawings to depict like or similar elements of the door hinge cover for door hinges. For the purposes of presenting a brief and clear description of the present invention, the preferred embodiment will be discussed as used for deploying to both sides of a door hinge to cover the hinge from paint. The figures are intended for representative purposes only and should not be considered to be limiting in any respect.

Figure 2A:
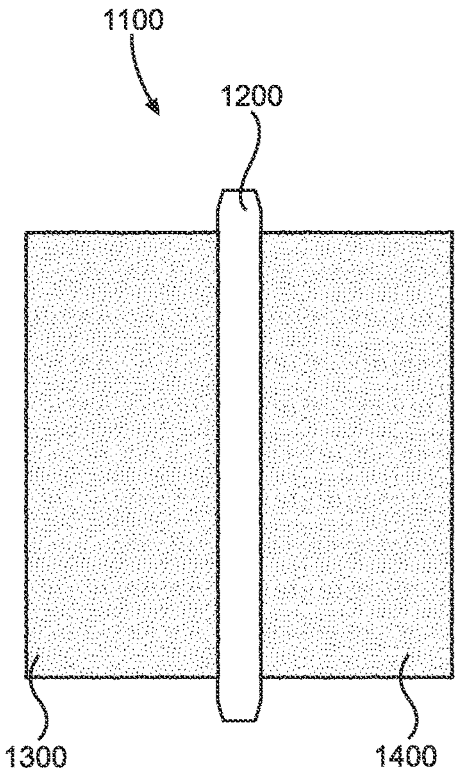
FIG. 2A shows a front view of an embodiment of the first cover of the door hinge cover with the elastic hinge under no tension.
Figure 2B:
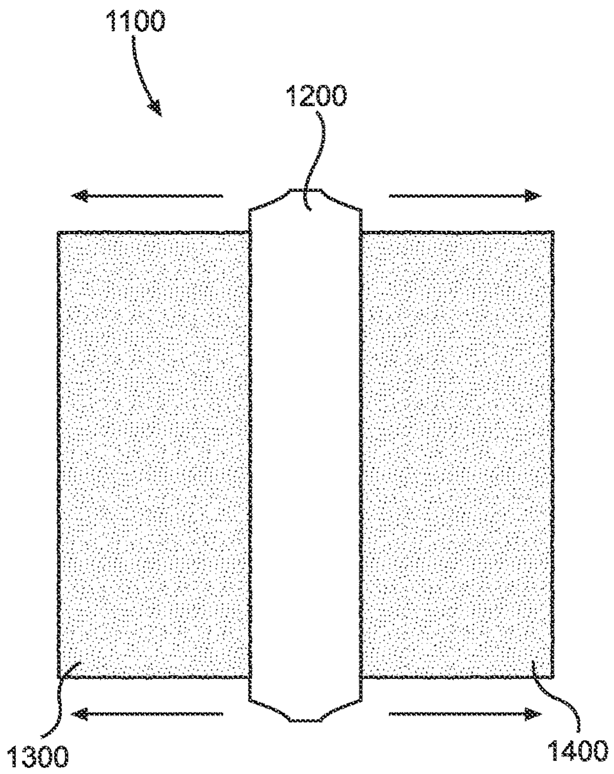
FIG. 2B shows a front view of an embodiment of the first cover of the door hinge cover with the elastic hinge being stretched.

Referring now to FIGS. 1-2B, there is shown a perspective view of an embodiment of the first cover of the door hinge cover positioned above a first side of a door hinge and a front view of an embodiment of the first cover of the door hinge cover with the elastic hinge under no tension and being stretched, respectively. The hinge cover 1000 is sized and adapted to be positioned over a door hinge 3000 to provide a barrier that covers the door hinge 3000 while painting or staining the surrounding surfaces. In the shown embodiment, the door hinge 3000 comprises a pair of hinge leaves 3200 with a pin 3100 that is received within the knuckle 3300. The hinge cover 1000 comprises a first cover 1100 having an elastic hinge 1200 sized to fit over a first side 3500 of a pin 3100 of a door hinge 3000. The elastic hinge 1200 is configured to expand and retract as the door hinge 3000 transitions between an open and closed position. The closed position is defined as the pair of hinge leaves 3200 being substantially parallel to one another and disposed along different planes, whereas the open position is defined as the pair of hinge leaves oriented such that the pair of hinge leaves are non-parallel to one another. A first panel 1300 and a second panel 1400 are disposed on opposing sides of the elastic hinge 1200, wherein each panel 1300, 1400 is adapted to be positioned over the hinge leaves 3200 of the door hinge 3000. In the illustrated embodiment, a second cover 2000 is also provided and shown in FIGS. 4-6. The second cover 2000 is adapted to be used in conjunction with the first cover 1100 to completely cover both sides of the door hinge.

In the shown embodiment, the elastic hinge 1200 of the first cover 1100 includes one or more tabs 1210. The tabs 1210 are sized to fit over the pins 3100 and cover them. In some embodiments, the tabs 1210 extend between 5-30 millimeters from the uppermost and lowermost edges of the panels 1300, 1400 respectively. The first hinge cover 1100 is composed of a flexible material, such as latex rubber, which allows the cover to be stretched over the hinge and to fit snugly over the hinge leaves 3200 of the door hinge 3000. The panels 1300, 1400 are sized to completely cover the pair of hinge leaves 3200, and the elastic hinge 1200 is sized to cover the pin and knuckle 3200, 3300 when the door is open and closed.

Figure 3:
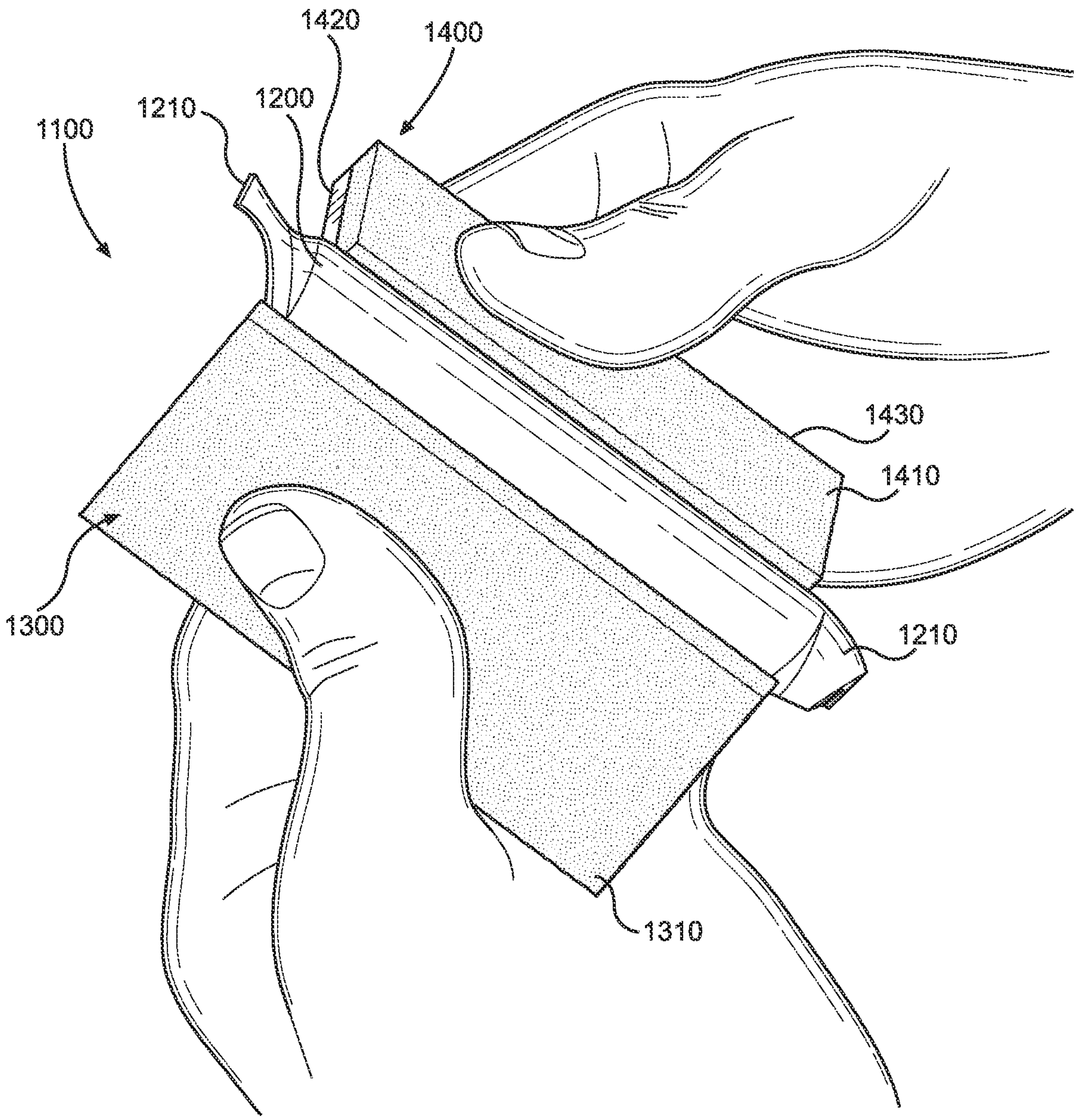
FIG. 3 shows a perspective view of an embodiment of the first cover of the door hinge cover wherein the elastic hinge of the first cover is in a bent position.

Referring now to FIG. 3, there is shown a perspective view of an embodiment of the first cover of the door hinge cover, wherein the elastic hinge of the first cover is in a bent position. In the shown embodiment, the user is bending the first door hinge cover 1100 about the elastic hinge 1200. In the illustrated embodiment, the first hinge cover 1100 comprises a pair of tabs that are used to cover the top and bottom of the pin 3100. In the shown embodiment, the tabs 1210 comprise the same material as the elastic hinge 1200. In alternative embodiments, the tabs 1210 comprise a different material from the elastic hinge 1200. In the illustrated embodiment, the first and second panels 1300, 1400 extend from opposing lateral sides of the elastic hinge 1200, wherein the ends perpendicular to the lateral sides of the elastic hinge 1200 terminate in the tabs. In the illustrated embodiment, the elastic hinge 1200 entirely separates the first and second panel and extends substantially the entire length of the length of the panels 1300, 1400.

In the shown embodiment, the first and second panel 1300, 1400 comprise a rectangular shape adapted to correspond to the shape of a conventional rectangular shaped hinge leaf. However, in alternate embodiments, the panels comprise any suitable shape configured to correspond to a substantially similarly shaped hinge leaf. In the illustrated embodiment, the first and second panel 1300, 1400 each comprise a pad 1310, 1410, wherein some embodiments, the pads include a greater thickness than a thickness of the elastic hinge 1200. The pads 1310, 1410 comprise a fastener, such as adhesive on a first face 1420 thereof. The pads 1310, 1410 protrude upwards from the second face 1430, wherein the second face 1430 is opposite the first face 1420, such that the pads 1310 are elevated relative to the elastic hinge 1200. The adhesive on the first face 1420 is adapted to adhere the first cover 1100 to the first side 3500 of the door hinge 3000. In some embodiments, the pad is composed of a rigid material, such as foam, wherein the second face 1430 of the pads 1310, 1410 is adapted to provide rigidity to the first cover. In this way, the rigidity provides added protection to the door hinge during painting or staining and allows for the adhesive side to be easily manipulated and pressed against the door hinge 3000.

In one embodiment, the elastic hinge 1200 comprises a transparent or semi-transparent material to allow the first door cover 1100 to be seen during the application of the cover 1100 to the door hinge 3000. In one embodiment, the first and second hinge covers 1100, 2000 may be vertically symmetrical, allowing the covers 1100, 2000 to be used in any orientation on either the top or bottom hinge 3000 of the door.

Figure 4:
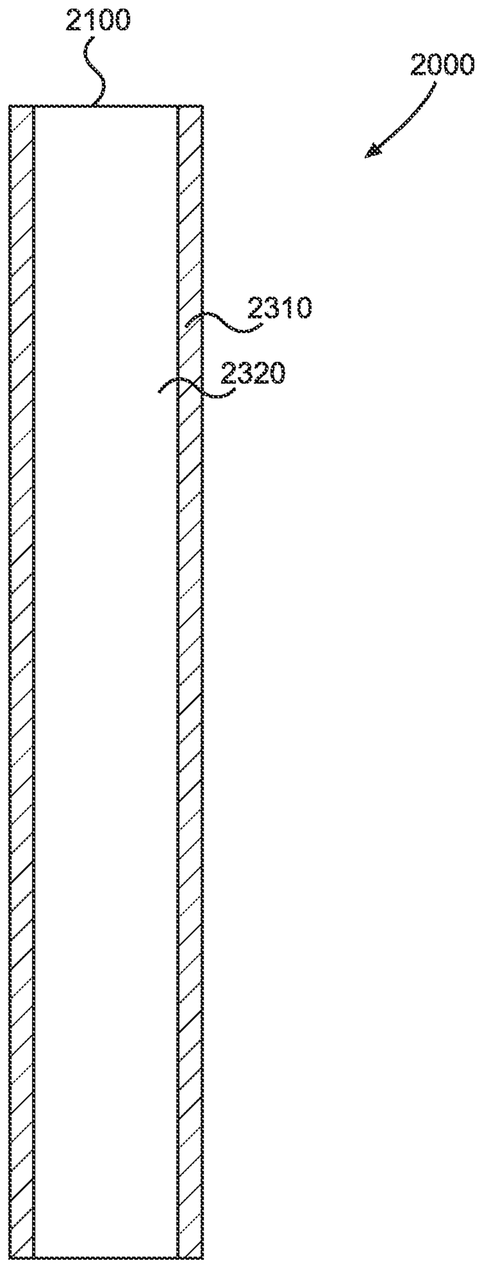
FIG. 4 shows a front view of an embodiment of the second cover of the door hinge cover.
Figure 5:
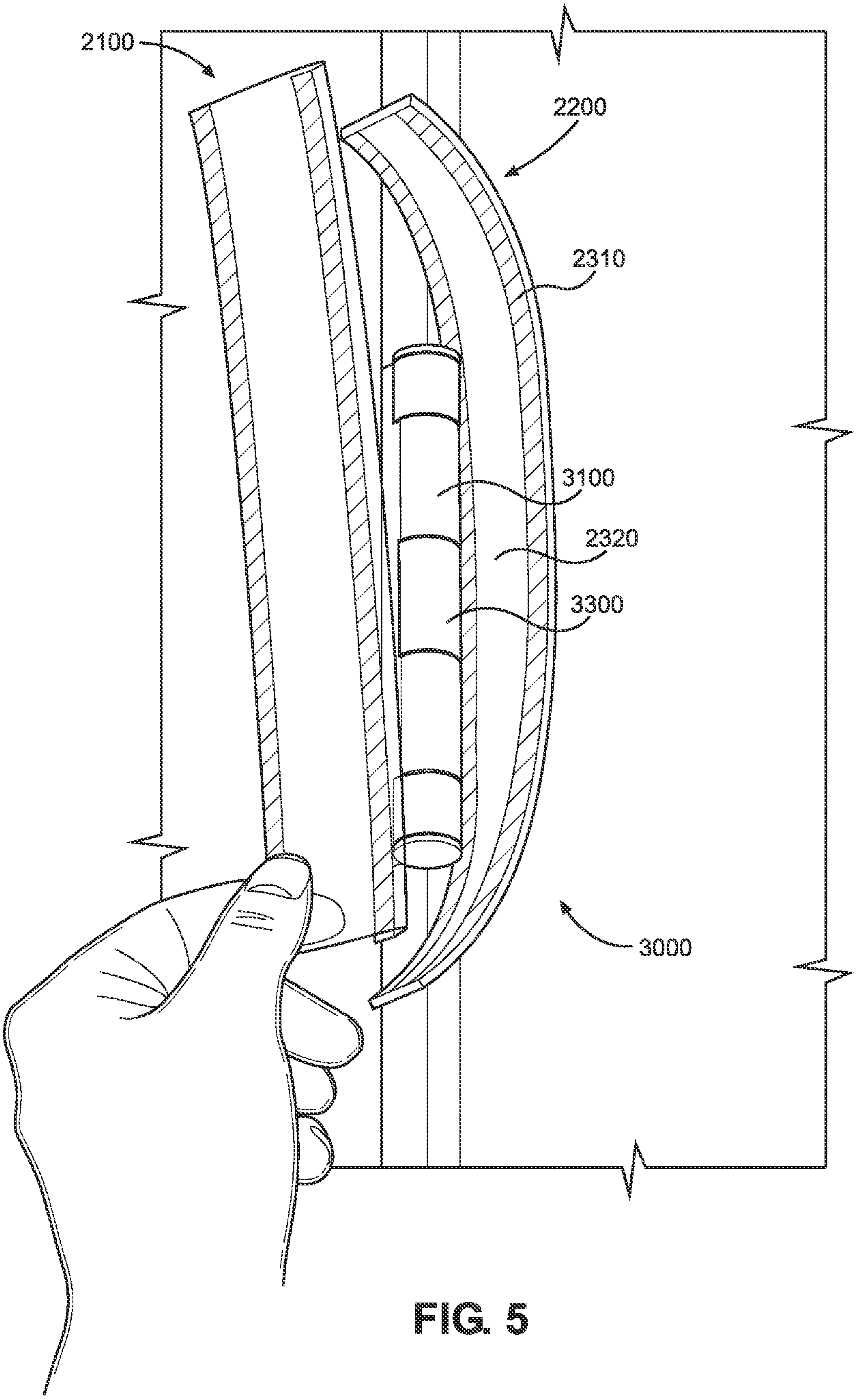
FIG. 5 shows a perspective view of an embodiment of the second cover of the door hinge positioned around the door hinge.
Figure 6:
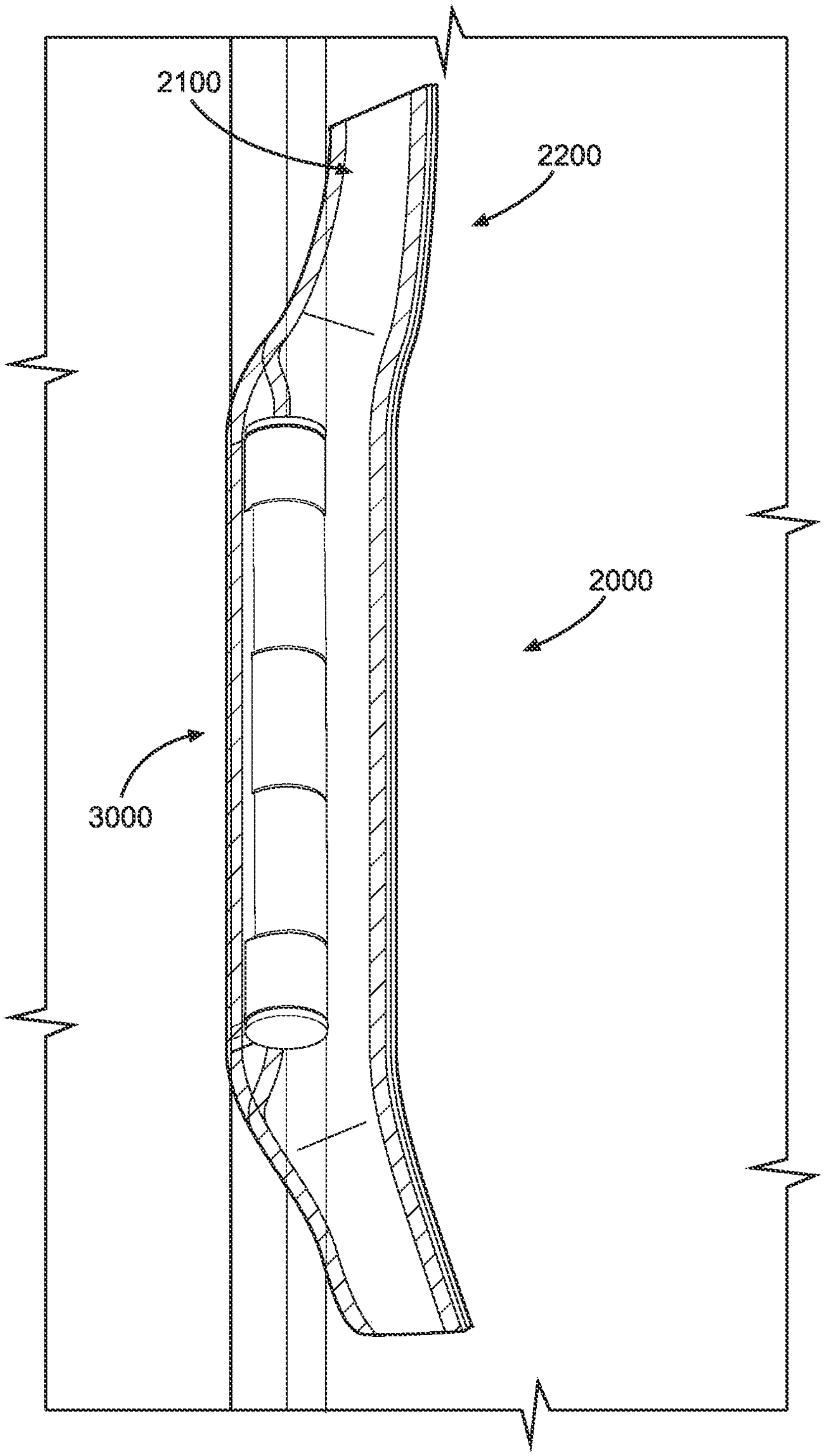
FIG. 6 shows a perspective view of an embodiment of the second cover of the door hinge affixed to the door hinge.

Referring now to FIG. 4, there is shown a front view of an embodiment of the second cover of the door hinge cover. The second cover 2000 comprises a first tape strip 2100 and a second tape strip 2200. Each tape strip 2100, 2200 (FIGS. 5 and 6 show the second tape strip 2200) has an interior side with an adhesive zone 2310 that extends along both lateral edges thereof and a non-adhesive central zone 2320. The non-adhesive central zone 2320 is sized to cover the pin and knuckle of the door hinge. In this way, as the hinge is opened and closed, the non-adhesive zone remains movable relative to the hinge. In the shown embodiment, the first tape strip 2100 comprises a rectangular shape wherein the adhesive zones 2310 have a first width, between two millimeters and twenty millimeters, and the non-adhesive central zone 2320 extends a second width that is greater than the first width. The adhesive and non-adhesive zones 2310, 2320 have a uniform width. The uniform width allows for the alignment of the non-adhesive zones 2320 and for the adhesive zones 2310 of the two strips 2100, 2200 to couple together. In alternative embodiments, the zones 2310, 2320 may be curved or only extend a portion of the length of the tape 2100. In one embodiment, the second cover 2000 comes in a rolled configuration, wherein the first tape strip 2100 and the second tape strip 2200 (shown in FIG. 5) are cut from the single roll. In this way, the tape strips 2100, 2200 are similar in shape and may be cut to a desired length. In an alternative embodiment, the second door hinge cover 2000 further comprises a release liner covering the adhesive zones 2310 of the tape strips 2100, 2200 adapted to be removed.

Referring now to FIGS. 5 and 6, there is shown a perspective view of an embodiment of the second cover of the door hinge positioned around the door hinge and a perspective view of an embodiment of the second cover of the door hinge affixed to the door hinge, respectively. In the shown embodiment, the first and second tape strips 2100, 2200 are used in cooperation to secure to a second side of the pin 3100 of the door hinge 3000 such that the adhesive zone 2310 of the first tape strip 2100 is adapted to secure to the adhesive zone 2310 of the second tape strip 2200 and the non-adhesive central zone 2320 is adapted to cover the pin 3100 and knuckle 3300 of the door hinge 3000. In some embodiments, only one of the first tape strips comprises the adhesive zones, wherein the second tape strip entirely comprises a non-adhesive zone capable of adhering to the adhesive zone of the first tape strip.

In one exemplary use of the hinge cover 1000 involves affixing both the first and second covers 1100, 2000 to the door hinge 3000 prior to spray painting. To use the hinge cover, a user first positions the first cover 1100 over the first side of the door hinge 3000, positioning the elastic hinge 1200 over the hinge pin 3100 until it covers the entire first side of the pin 3100. The first panel and second panel 1300, 1400 of the first cover 1100 are then positioned over the hinge leaves 3200 on opposing sides of the elastic hinge. Next, the user unrolls the second cover 2000 to reveal the adhesive zones of the tape strips 2100,2200. The user then positions both tape strips 2100 to face each other and sandwiching the pin 3100 and knuckle 3300 over the second side of the door hinge 3000, ensuring that the tape strips 2100,2200 extend both sides of the hinge pin 3100. The non-adhesive central zone of the second tape strip covers the hinge pin. The hinge covers 1100, 2000 are now in place and the user can proceed to spray paint the door and surrounding surfaces without worrying about paint getting on the hinge 3000. The elastic hinge 1200 allows the door hinge to move freely, so the user can open and close the door without removing the covers. Once the paint has dried, the covers 1100, 2000 can be easily removed by pulling them away from the hinge. The low-tack adhesive used in the tape strips 2100, 2200 ensures that the covers can be removed without leaving any residue on the door hinge or surrounding surfaces.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hinge cover, comprising:

a first cover having an elastic hinge sized to fit over a first side of a pin of a door hinge, the elastic hinge being both flexible and stretchable, whereby the elastic hinge is configured to expand and retract as the door hinge transitions between an open and closed position;

a first panel and a second panel disposed on opposing sides of the elastic hinge, wherein each panel is adapted to be positioned over hinge leaves of the door hinge, wherein each panel comprises a rigid pad, wherein a first face of each pad comprises an adhesive and is configured to temporarily fasten the first cover to the door hinge;

a pair of tabs that protrude outward from the elastic hinge, wherein the pair of tabs are configured to facilitate placement and removal of the first cover from the door hinge, wherein each tab of the pair of tabs is sized to fit over and cover a top or a bottom of the pin;

wherein the first hinge cover is symmetrical along a longitudinal axis;

wherein the elastic hinge comprises an entire length of a length of the first cover, wherein the elastic hinge is coextensive with a lower side of the first and second panels;

wherein the first and second panel are positioned on a front side of the elastic hinge, wherein the elastic hinge comprises a continuous rear side that is configured to directly contact the door hinge;

wherein the elastic hinge is sized to cover the pin and knuckle when the door hinge is in or between either of the open position and the closed position;

a second cover comprising a first tape strip and a second tape strip, wherein each tape strip comprises an interior side having an adhesive zone that extends along both lateral edges thereof and a non-adhesive central zone;

wherein the first and second tape strips are used in cooperation to secure to a second side of the pin of the door hinge such that the adhesive zone of the first tape strip is adapted to secure to the second tape strip and the non-adhesive central zone is adapted to cover the pin of the door hinge.

2. The hinge cover as claimed in claim 1, wherein the elastic hinge is made of latex rubber.

3. The hinge cover as claimed in claim 1, wherein the first and second panels comprise a transparent material to allow the door hinge to be seen when mounting thereto.

4. The hinge cover as claimed in claim 1, wherein the first and second panels of the first cover are similar in dimension.

5. The hinge cover as claimed in claim 1, wherein each pad comprises a thickness larger than a thickness of the elastic hinge.

6. The hinge cover of claim 1, wherein the second cover further comprises a release liner covering the adhesive zones of the tape strips adapted to be removed.

7. The hinge cover of claim 1, wherein the adhesive used in the tape strips is low-tack, allowing for easy removal of the hinge cover without leaving a residue.

* * * * *